United States Patent
Gruian

(12) 
(10) Patent No.: US 7,210,522 B2
(45) Date of Patent: May 1, 2007

(54) ARRANGEMENT FOR COOLING A VEHICLE COMPONENT

(75) Inventor: Marian Gruian, Partille (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 11/308,287

(22) Filed: Mar. 15, 2006

(65) Prior Publication Data

US 2006/0180103 A1 Aug. 17, 2006

Related U.S. Application Data

(63) Continuation of application No. PCT/SE2004/001458, filed on Oct. 12, 2004.

(30) Foreign Application Priority Data

Oct. 15, 2003 (SE) .................................... 0302740

(51) Int. Cl.
 *F01P 3/12* (2006.01)
 *F01P 7/16* (2006.01)
 *F02B 29/04* (2006.01)

(52) U.S. Cl. .................. 165/202; 165/51; 165/140; 165/101; 123/41.29; 123/41.31; 123/41.33; 123/41.1; 123/563; 237/12.3 B; 60/599; 74/606 A; 74/467; 184/6.22; 184/6.12

(58) Field of Classification Search .................. 165/51, 165/140, 916, 202, 101; 123/41.29, 41.31, 123/41.33, 563, 41.1; 237/12.3 A, 12.3 B; 60/599; 74/606 A, 467; 184/6.22, 6.12

See application file for complete search history.

(56) References Cited

U.S. PATENT DOCUMENTS

| | | | | |
|---|---|---|---|---|
| 2,008,164 A | * | 7/1935 | Wolf | 165/51 |
| 2,188,172 A | * | 1/1940 | Brehob | 123/41.29 |
| 2,749,050 A | * | 6/1956 | Booth | 237/12.3 B |
| 4,058,980 A | * | 11/1977 | Ahlen | 165/916 |
| 4,180,032 A | * | 12/1979 | Plegat | 123/563 |

(Continued)

FOREIGN PATENT DOCUMENTS

DE 3200688 7/1983

(Continued)

OTHER PUBLICATIONS

International Search Report for corresponding application PCT/SE2004/001458.

*Primary Examiner*—John K. Ford
(74) *Attorney, Agent, or Firm*—WRB-IP LLP

(57) ABSTRACT

The invention constitutes an arrangement for cooling a vehicle component, for example a transmission, disposed adjacent to an engine, which arrangement includes a cooling circuit designed to feed a coolant through the transmission and including a line for coolant to the transmission and a line for coolant to the transmission. According to the invention, the cooling circuit is also designed to cool the engine and includes a further line for feeding the coolant to the engine, and the cooling circuit includes a flow control valve for controlling the coolant in the cooling circuit such that the flow of coolant to the vehicle component is lower than the flow to the engine. As a result of the invention, an improved arrangement is obtained for cooling, for example, a transmission, for example in heavy goods vehicles.

8 Claims, 1 Drawing Sheet

U.S. PATENT DOCUMENTS

| | | | | |
|---|---|---|---|---|
| 4,325,219 A | * | 4/1982 | Stang et al. | 60/599 |
| 4,620,509 A | * | 11/1986 | Crofts | 123/41.31 |
| 5,526,873 A | * | 6/1996 | Marsais et al. | 123/41.33 |
| 6,006,731 A | * | 12/1999 | Uzkan | 123/41.29 |
| 6,158,398 A | * | 12/2000 | Betz | 123/41.29 |

FOREIGN PATENT DOCUMENTS

| | | |
|---|---|---|
| DE | 19854389 | 5/2000 |
| EP | 0860592 | 8/1998 |
| WO | WO 2005038209 A1 * | 4/2005 |

* cited by examiner

ARRANGEMENT FOR COOLING A VEHICLE COMPONENT

BACKGROUND AND SUMMARY

The present application is a continuation of International Application No. PCT/SE2004/001458, filed Oct. 12, 2004, which claims priority to SE 0302740-6, filed Oct. 15, 2003, both of which are incorporated by reference.

The present invention relates to an arrangement for cooling a vehicle component disposed adjacent to an engine, which arrangement comprises a cooling circuit designed to feed a coolant through the vehicle component and comprising a line for coolant to the vehicle component and a line for coolant from the vehicle component.

The invention is particularly intended for cooling transmissions of the type employed in motor vehicles.

In connection with motor vehicles, there is a need for certain components, for example the engine and transmission of the vehicle, and other components mounted on or close to the engine, such as EGR valve (EGR=Exhaust Gas Recirculation), compressor, turbo, steering gear, etc., to be cooled. Not least, this requirement is great in heavy goods vehicles. Both an engine and a transmission contain oil, which is used in a known manner to lubricate and cool integral parts, for example in the form of the pistons of the engine and the gearwheels of the transmission. In addition, cooling circuits containing a coolant, for example water, are used to cool the engine and the transmission.

The need to cool the engine and the transmission stems from the fact that there is a risk of overheating of the engine oil and transmission oil respectively, especially under certain running conditions of the vehicle in question. This can result, in turn, in impaired lubricating properties for the oil, which, in turn, can lead to impaired functioning and reduced working life of the engine and the transmission.

In order to cool an internal combustion engine, it is known to use a coolant, expediently water, which, by means of a pump, is conducted in an external cooling circuit past a radiator and onward to the engine. In this way, the coolant will circulate in the engine and will subsequently be returned to the radiator by means of the pump. A corresponding cooling circuit can also be used to cool a transmission.

This solution, in which the coolant of the engine also cools the transmission oil, can work satisfactorily in certain situations. On modern engines, in which the cooling system often has a higher pressure and hence a higher temperature than corresponding older cooling systems, the solution does not work particularly well. The temperature of the cooling system is in this case higher than the recommended maximum permitted temperature of the transmission oil, the result of which is that the transmission oil is aged too quickly and the lubricating properties are poor. For instance, a cooling system can be 110° C. warm, but the recommended oil temperature of the transmission is 90° C.

An arrangement for cooling an engine is previously known through patent document US 2002/0112679, which arrangement comprises a first heat exchanger for cooling the engine oil by means of a coolant. The arrangement also comprises a second heat exchanger cooling the oil via heat exchange with an ambient air flow. The oil flow to the engine is normally directed via the first heat exchanger (and onward to the engine and its lubricating system), but a certain part of the oil flow to the engine can be directed by means of a restrictor to the second heat exchanger, in dependence on the engine temperature. The second heat exchanger is disposed parallel with the first heat exchanger.

US 2002/0112679 shows therefore that lubricating oil for an engine can be fed via a first radiator and a second radiator, but discloses nothing to solve the abovementioned problem concerning an increased cooling requirement of a transmission.

It is desirable to provide an improved arrangement for cooling, for example, a transmission, in which the above problem is solved.

In accordance with an aspect of the present invention, in an arrangement for cooling a vehicle component disposed adjacent to an engine, which arrangement comprises a cooling circuit designed to feed a coolant through the vehicle component and comprising a line for coolant to the vehicle component and a line for coolant from the vehicle component, the cooling circuit is also designed to cool the engine and comprises a further line for feeding the coolant to the engine, and the cooling circuit comprises a flow control valve for controlling the coolant in the cooling circuit such that the flow of coolant to the vehicle component is lower than the flow to the engine.

By virtue of an aspect of the invention, certain substantial benefits can be obtained. It may first of all be noted that aspects of the invention produce an effective cooling of a vehicle component, such as, for example, a transmission, with a cooling temperature that is lower than the corresponding temperature of the coolant that is fed to the engine. In addition, aspects of the invention create an arrangement for cooling a vehicle component that does not require, for example, a special coolant pump and special pipes for the transmission coolant. Instead, according to the invention, a common coolant pump is used to feed coolant both to the engine and to the transmission.

Preferably, according to an aspect of the invention, a cooling circuit is used, which, in turn, comprises two separate lines with two different temperatures. More precisely, these lines are in this case designed such that a lower flow is obtained in the line used to feed a coolant through the transmission compared with the line used to feed coolant through the engine. This results in an increased cooling capacity and hence a lower temperature for cooling the transmission than what was previously offered. This leads to benefits in terms of operation and service life of the transmission.

BRIEF DESCRIPTION OF THE DRAWING

The invention will be described below with reference to the appended FIG. 1, which shows in diagrammatic form a system comprising an engine and a transmission, in which the invention is applied in a preferred embodiment.

DETAILED DESCRIPTION

Figure 1:
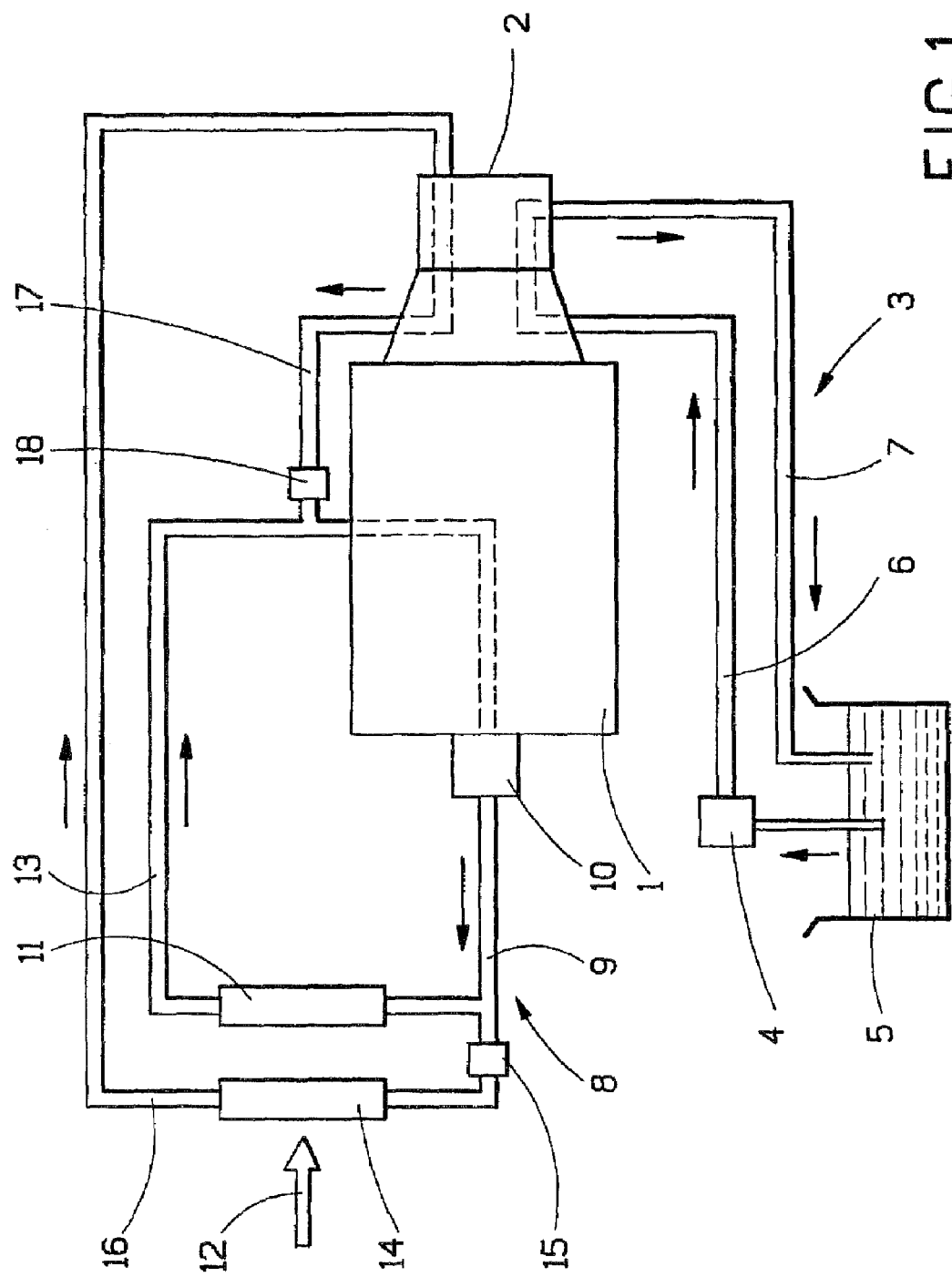

The invention will now be described below with reference to FIG. 1, which shows diagrammatically an arrangement according to a preferred embodiment of the invention. As can be seen from FIG. 1, this arrangement is based on an internal combustion engine 1 of conventional type, for example in the form of a diesel engine for a truck. A vehicle component, here in the form of a transmission 2, is arranged in a known manner adjacent to the engine 1. As stated above, for the transmission 2, there is a need for the transmission 2 to be lubricated with oil. The figure therefore basically illustrates how a lubricating oil system 3 extends through the transmission 2 for the lubrication and cooling of components forming part of the transmission 2. More precisely, for this purpose, a lubricating oil system 3 is used which has an oil pump 4 for feeding oil from an oil sump 5, via a feed line 6 and onward through the lubricating oil system 3. These components are advantageously integrated in the transmission. After having passed through the transmission 2, the oil is then returned to the oil sump 5 via a return line 7. In this way, the oil is used to lubricate and cool components in the transmission 2. This is known per se and is therefore not described in closer detail.

The engine 1, too, is provided in a known manner with a lubricating oil system, which is not, however, shown in detail in the figure.

Furthermore, the engine 1 and the transmission 2 are provided with a cooling circuit 8 for a suitable coolant, for example water. The cooling circuit 8 comprises a first line 9, through which the coolant, by means of a coolant pump 10, is made to flow in the direction of a first radiator 11, which, in a known manner, is mounted in the vehicle in such a way that it is cooled by an onrushing air flow, as is shown by an arrow 12 in the figure. The first radiator 11 acts therefore as a heat exchanger, which, during an exchange of heat with the ambient air, works such that the temperature of the coolant is lowered during its passage through the radiator 11. The coolant is fed onward to the engine 1 via a second line 13, and then out to the coolant pump 10 and onward through the cooling circuit 8.

A basic principle behind the present invention is that, in addition to the abovementioned first radiator 11 for the engine 1, it also comprises a second radiator 14, which is connected in the cooling circuit 8 parallel with the first radiator 11. The second radiator 14 can expediently be of substantially the same kind as the first radiator 11. The coolant in question is fed forward through the first line 9 and onward to, on the one hand, the first radiator 11 and, on the other hand, the second radiator 14, the flow being divided by means of a flow control valve 15. As can be seen from the figure, this flow division preferably takes place upstream of the first radiator 11 and the second radiator 14, the flow control valve 15 acting as a restrictor which is designed to produce a lower flow of the coolant flowing through the second radiator 14 compared with the flow through the first radiator 11.

Expediently, the flow control valve 15 is permanently set, i.e., it is not adjustable, but produces a previously defined reduction of the coolant flow in the second radiator 14 compared with the first radiator 11. The invention is not, however, limited to such an embodiment, but rather the flow control valve can, in principle, also be adjustable, for example as a function of the temperature of the transmission 2 and/or in the engine 1. Where the flow control valve is adjustable, it is provided with a connection for control from an external control unit, for example an existing computer-based control unit in the vehicle, the flow to the second radiator 14 being controlled as a function of suitable parameters.

Furthermore, the second radiator 14 is connected to the transmission 2 by a third line 16. As a result of the lower flow in the second radiator 14 compared with the first radiator 11, i.e. as a result of the fall in pressure which occurs in the engine cooling circuit because of the flow control valve 15, the temperature of the coolant in the third line 16 (leading to the transmission 2) will be lower than the corresponding temperature in the second line 13 (leading to the engine 1). This means, in turn, that the cooling effect for the cooling of the transmission 2 can be increased. This, in turn, brings benefits in terms of the operation, working life, etc. of the transmission 2. It may be noted that the temperature in the third line 16 leading to the transmission 2 is determined by a suitably chosen flow in the second radiator 14, i.e. by the choice of the abovementioned flow control valve 15.

Following passage of the coolant through the transmission 2, during which cooling takes place, the coolant is conducted onward from the transmission 2 through a fourth line 17, which constitutes a line emanating from the transmission 2 and connecting to the second line 13 somewhat upstream of the inlet thereof to the engine 1.

The cooling in the transmission 2 can be realized in a suitable manner, expediently by means of a heat exchanger (not shown) of a kind that is known per se, but suitably positioned cooling ducts may also be employed to cool the transmission.

Expediently, a nonreturn valve 18 is used, which is disposed adjacent to the point where the fourth line 17 connects to the second line 13. A backflow of coolant along the fourth line 17 and back to the transmission 2 is thereby prevented.

According to the invention, a cooling circuit 8 is therefore used, by means of which the coolant from the engine 1 can be divided into two flows. That part of the coolant that passes through the flow control valve 15 and flows to the second radiator 14 will have a lower flow and hence a lower temperature than the corresponding flow through the first radiator 11. In this way, an effective cooling of the transmission 2 is obtained without the need to use a wholly separate cooling system to cool the transmission, i.e. with separate pump, feed lines, etc. Where the temperature of the engine 1 is relatively high, the invention offers the benefit, therefore, that the coolant in the engine 1 is not conducted directly to the transmission 2, but instead via the flow control valve 15, the second radiator 14, the third line 16 and then forward to the transmission 2.

The two radiators 11, 14 can expediently be disposed adjacent to each other and are then both cooled by onrushing air, according to the arrow 12. The radiators 11,14 can expediently be disposed one in front of the other in the front of the vehicle so that they are cooled by an onrushing air flow whilst the vehicle is running.

In one embodiment of the invention, one or more vehicle components are cooled. These can be, for example, a cooling compressor, EGR valve, exhaust-gas turbo, steering gear, or some other component in which a cooling requirement exists. The cooling requirement can either be due to the fact that the component per se generates heat or that the component is mounted in a hot place, for example close to the exhaust system of the engine. For instance, an EGR valve can be mounted on the manifold of the engine, which means that the EGR valve either has to be designed to withstand a high temperature or the EGR valve has to be cooled.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is not limited to the above-stated embodiments, but may be varied within the scope of the following patent claims. For example, the radiators 11, 14 can be placed one in front of the other, or alternatively side by side. Moreover, the flow control valve 15 can, for example, be permanently set or adjustable.

Moreover, the invention can be implemented in various types of engines and various types of vehicles.

What is claimed is:

1. An arrangement for cooling at least one vehicle component disposed adjacent to an engine, the arrangement comprising:
    a cooling circuit, the cooling circuit comprising
        a line feeding coolant to the vehicle component and a line feeding coolant from the vehicle component, the line feeding coolant from the vehicle component comprises a nonretum valve,
        a further line feeding the coolant to the engine, and
        a flow control valve controlling the coolant in the cooling circuit such that the flow of coolant to the vehicle component is lower than the flow to the engine;
    a pump feeding the coolant through a first line and then onward, on the one hand, to the line feeding coolant to the vehicle component and, on the other hand, to the further line feeding the coolant to the engine, the flow control valve being arranged along the line feeding coolant to the vehicle component;
    a first radiator arranged along the further line feeding the coolant to the engine and a second radiator arranged along the line feeding coolant to the vehicle component, the first radiator and the second radiator being air-cooled.

2. The arrangement as claimed claim 1, wherein the vehicle component is one of the following: transmission, compressor, steering gear, EGR valve, exhaust-gas turbo, power-take-off, electronics unit or cabling.

3. The arrangement as claimed in claim 2, wherein the vehicle component comprises a heat exchanger.

4. The arrangement as claimed in claim 1, wherein the vehicle component comprises a heat exchanger.

5. A vehicle comprising the arrangement as claimed in claim 1.

6. An arrangement for cooling at least one vehicle component disposed adjacent to an engine, the arrangement comprising:
    a cooling circuit, the cooling circuit comprising
        a line feeding coolant to the vehicle component and a line feeding coolant from the vehicle component,
        a further line feeding the coolant to the engine, and
        a flow control valve controlling the coolant in the cooling circuit such that the flow of coolant to the vehicle component is lower than the flow to the engine;
    a pump feeding the coolant through a first line and then onward, on the one hand, to the line feeding coolant to the vehicle component and, on the other hand, to the further line feeding the coolant to the engine, the flow control valve being arranged along the line feeding coolant to the vehicle component;
    a first radiator arranged along the further line feeding the coolant to the engine and a second radiator arranged along the line feeding coolant to the vehicle component, the first radiator and the second radiator being air-cooled wherein the second radiator is arranged downstream of the flow control valve, wherein the line feeding coolant from the vehicle component comprises a nonreturn valve.

7. The arrangement as claimed in claim 6, wherein the vehicle component is one of the following: transmission, compressor, steering gear, EGR valve, exhaust-gas turbo, power-take-off, electronics unit or cabling.

8. The arrangement as claimed in claim 7, wherein the vehicle component comprises a heat exchanger.

* * * * *